March 10, 1942.    S. BARKER    2,275,884
MEAT TENDERER
Filed Aug. 27, 1941

Inventor,
SAMUEL BARKER.
By E. E. Vrooman & Co.
His Attorneys.

Patented Mar. 10, 1942

2,275,884

UNITED STATES PATENT OFFICE 2,275,884

MEAT TENDERER

Samuel Barker, Akron, Ohio

Application August 27, 1941, Serial No. 408,539

2 Claims. (Cl. 17—29)

This case was originally filed January 6, 1933, Serial Number 650,549, and abandoned, and the claims herein were allowed per the official actions of March 13, 1934, and June 19, 1934.

This invention relates to a meat tenderer, and more particularly to a device that is known technically as a hand-roll meat-tenderer device.

An object of my invention is to provide a hand tool, which is efficient, convenient and light in weight and which can be carried easily from place to place and hung up when not in use.

Another object of the invention is the construction of a simple and efficient device for use in lacerating and making incisions in all kinds of meat by a rolling action, whereby any size of steak, pork, lamb, or veal chops or meat roasts have their fibers, tissues and tendons severed, rendering the meat very tender, more easily masticated and digested. Such treatment of the meat leaves pockets therein, in which pockets are collected and retained both the natural juices and any artificial flavoring that may be introduced while cooking. Such treatment also shortens the time of cooking the meat. However, due to the spacing of the lacerations, any meat so treated is left to all appearance in its original condition, eliminating any lacy appearance.

A still further object of my invention is the production of a tool employing a novel spring guard, the normal position of which guard is low enough to hold rigidly to the cutting block any steak or chop that might be treated. The spring tension of the guard is flexible enough to push up and extend forward to hold extremely thick steak or meat that it may be desirable to treat.

With the foregoing and other objects in view, my invention comprises certain novel constructions, combinations and arrangements of parts as will be hereinafter fully described, illustrated in the accompanying drawing and more particularly pointed out in the appended claims.

In the drawing:

Figure 1 is a view in side elevation of a meat tenderer device constructed in accordance with the present invention, while

Figure 1:
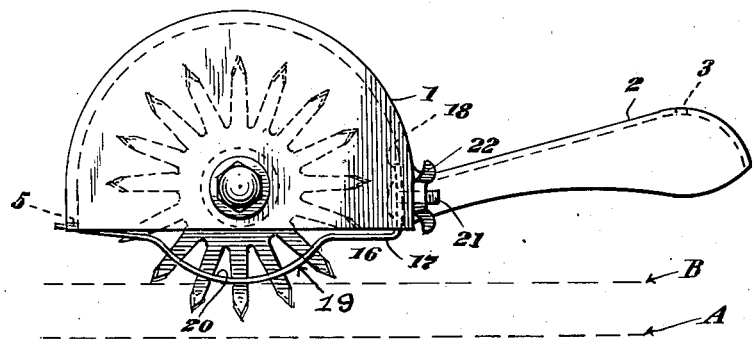
Figure 2:
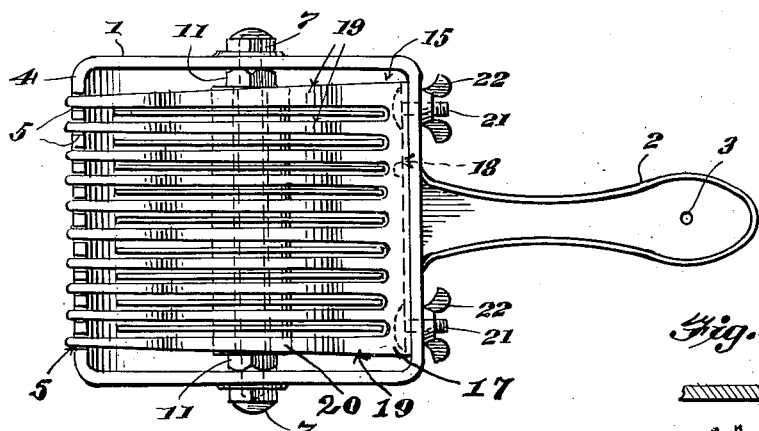
Figure 2 is a bottom plan view of the same.
Figure 4:
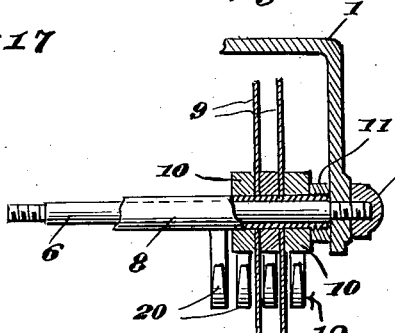
Fig. 4 is a fragmentary, longitudinal sectional view of the device.
Figure 3:
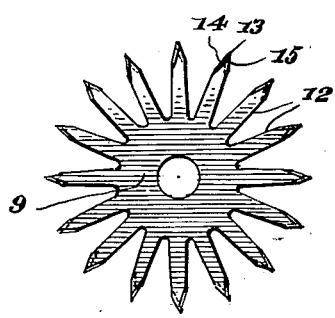
Figure 3 is a view in side elevation of one of the toothed cutter discs.

Referring to the drawing by numerals, 1 designates a hood-like casing or frame, which is provided with an integral hollow handle 2. Handle 2 is provided with an aperture 3, whereby the device can be hung up when not in use, since a nail will readily enter the aperture 3. In the forward edge 4 only of the frame 1, there is a plurality of receiving notches 5.

A stationary shaft 6 extends through the sides of the frame 1 with nuts 7 on its ends. A hollow mandrel 8 is on the stationary shaft 6. Toothed cutter discs 9 are placed on the mandrel 8 and are spaced by spacing washers 10. The discs 9 and the washers 10 are held tight together by nuts 11 on the ends of the mandrel 8. The mandrel 8, discs 9, washers 10 and nuts 11 form a cutting cylinder, all revolving as a unit on the stationary shaft 6 within the frame 1.

Each cutter disc 9 is provided with teeth 12. Each tooth 12 is provided with an outer cutting edge 13, and with bevelled inner cutting edges 14 and 15; the cutting edges 13, 14 and 15 produce three separate and distinct cutting actions on the meat, to-wit: first severing the tissues on entering at the angle it does, then cutting on its downward course, and finally cutting its path out as it leaves the meat. This function is valuable in producing efficient results.

The self-aligning stripper or guard 16 is formed from a single piece of sheet-like metal and comprises a guard body 17 that has an upstanding inner end 18. Extending forwardly from the guard body 17, is a plurality of integral runner fingers 19. Each finger 19 is formed at its center with a downwardly-extending semi-circular portion 20 that rides efficiently over the meat irrespective as to its thickness. There are no angles or projections to the semi-circular center of each finger, so that it performs its work satisfactorily. The inner and outer ends of each finger are substantially straight. The outer end of each finger rests in a notch 5. Therefore, each finger is guided by this notch, which also keeps the finger in true and efficient alignment. When the finger is under pressure, by reason of riding over the streak, the outer end of the finger can slide back and forth in the notch, without getting out of alignment. Under normal conditions, (Fig. 1) the device holds the top of the meat, designated by dotted line B, tight, causing the meat to rest snugly on the cutting block or table designated by dotted line A. The resiliency of the spring fingers is sufficient to permit them to be pushed up and extend forward in the guiding notches 5 to hold thick steak or meat, when acting on the same.

The bolts 21 extend through the back of the frame 1 and through the upstanding inner end 18 of the guard body 17, holding the guard 16 in place; nuts 22 are placed on the bolts 21 for fastening the parts together.

From the foregoing, it will be apparent that the device can be efficiently used, by reason of the peculiar construction of the fingers and notches, for lacerating and making incisions on all kinds of meat, and even if a bone is encountered, it will not injure the device as it will pass over the bone readily. The frame covers approximately two-thirds of the disc with the readily-adjustable spring guard fitting snugly in position and adapted to be projected forwardly through notches 5 when under unusual pressure.

While I have described the preferred embodiment of my invention and illustrated the same in the accompanying drawing, certain minor changes or alterations may appear to one skilled in the art to which this invention relates, during the extensive manufacture of the same, and I, therefore, reserve the right to make such alterations or changes as shall fairly fall within the scope of the appended claims.

What I claim is:

1. As a new article of manufacture, a meat tenderer comprising a hood-like casing provided with parallel straight front and rear edges, a cutting unit on said casing, and a broad single-piece sheet metal guard provided with an integral straight broad rear portion bent up and secured within said hood-like casing against the inner face, said straight front edge provided throughout its length with a series of cut-in notches, said hood guard provided with a series of runner fingers extending from said straight rear portion throughout its entire length, and said runner fingers extending forwardly and freely slidable within said notches on the straight front edge.

2. As a new article of manufacture, a meat tenderer, comprising a hood-like casing having an open bottom, said casing provided with a forward straight edge and a rearward straight edge in parallelism, said forward straight edge provided throughout its length with a series of receiving notches, a cutting unit on said casing, a broad guard formed from a single piece of sheet-like metal and comprising a body of substantially the same length as said rear straight edge, said body provided with forwardly-extending runner fingers, said body provided with an upstanding broad inner end within said casing contiguous to said rear straight edge, and means fastening said upstanding broad inner end to the inner face of said casing, and said runner fingers mounted near their outer ends in said receiving notches and extending beyond the outer edge of said notches and forward edge and slidably mounted in said notches, substantially as shown and described.

SAMUEL BARKER.